United States Patent [19]

Billet et al.

[11] Patent Number: 4,722,715
[45] Date of Patent: Feb. 2, 1988

[54] TORSIONAL DAMPER DEVICE

[75] Inventors: René Billet, Lamorlaye; Michel Bacher, Domont, both of France

[73] Assignee: VALEO, Paris, France

[21] Appl. No.: 820,964

[22] Filed: Jan. 22, 1986

[30] Foreign Application Priority Data

Jan. 29, 1985 [FR] France ................. 85 01223

[51] Int. Cl.$^4$ .............................................. F16D 3/12
[52] U.S. Cl. ................................. 464/67; 192/106.2
[58] Field of Search ................... 192/70.17, 106.2; 464/66, 67, 68

[56]  References Cited

U.S. PATENT DOCUMENTS

| | | | |
|---|---|---|---|
| 2,002,115 | 5/1935 | Kjaer | 464/67 X |
| 2,251,128 | 7/1941 | Goodwin | 192/106.2 |
| 2,304,039 | 12/1942 | Tower | 192/106.2 |
| 3,628,353 | 12/1971 | Armstrong | 192/106.2 X |
| 4,347,717 | 9/1982 | Lamarche | 464/64 |
| 4,413,711 | 11/1983 | Lamarche | 192/106.2 X |

FOREIGN PATENT DOCUMENTS

| | | | |
|---|---|---|---|
| 0110553 | 6/1984 | European Pat. Off. | |
| 862606 | 3/1941 | France | 464/68 |
| 2111645 | 7/1983 | United Kingdom | 464/67 |

Primary Examiner—Daniel P. Stodola
Attorney, Agent, or Firm—Charles E. Brown; Charles A. Brown

[57]  ABSTRACT

A torsional damper device comprises at least two coaxial parts disposed to rotate relative to each other within defined limits of relative angular displacement. Circumferentially acting elastic members are adapted to operate circumferentially between the coaxial parts over part at least of such relative angular displacement. The elastic members includes at least two coil springs spaced circumferentially along a common circumference of the device. Retainers associated with the coil springs, common to all the coil springs, are adapted to retain the coil springs against the action of centrifugal force. The retainers are disposed at least in part radially outside the common circumference.

18 Claims, 22 Drawing Figures

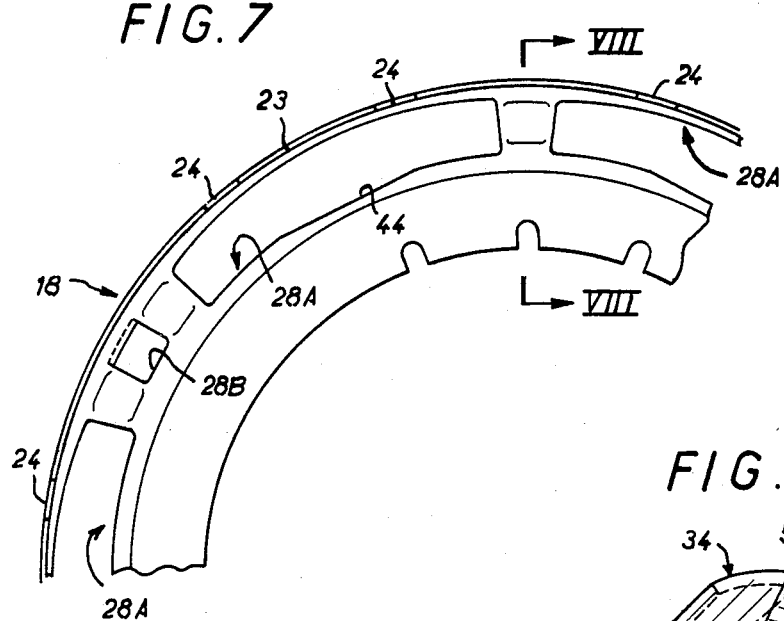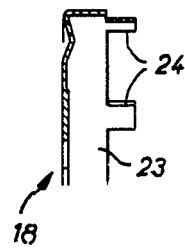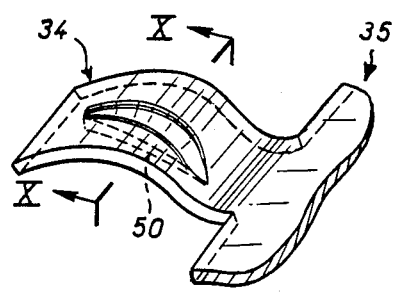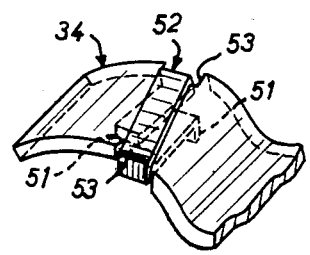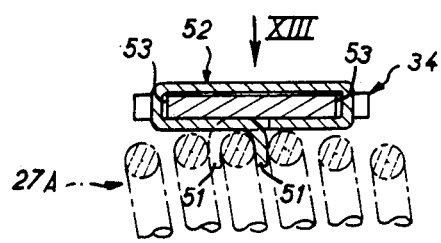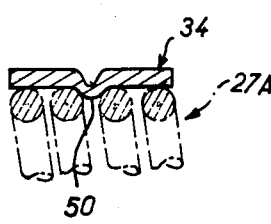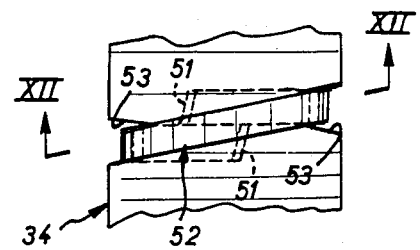

4,722,715

TORSIONAL DAMPER DEVICE

BACKGROUND OF THE INVENTION

1. Field of the Invention

The present invention is generally concerned with torsional damper devices of the kind comprising at least two coaxial parts disposed to rotate relative to each other within defined limits of relative angular displacement against elastic means, referred to as circumferentially acting elastic means, adapted to operate circumferentially between them over part at least of said relative angular displacement.

2. Description of the Prior Art

As is known, in an automotive vehicle a torsional damper device of this kind is normally inserted into the kinematic system extending from the motor to the axles, in order to filter out vibration likely to arise at any point along this kinematic system, and thus to procure regulated transmission of rotational torque along the system.

In practice, in order to match them to the values of torque to be transmitted, the circumferentially acting elastic means employed within a torsional damper device of this kind operate in stages, only part of them being operative for low values of torque whereas, for higher values of torque, the remaining part of the circumferentially acting elastic means in turn comes into operation, either all at once or in successive stages, adding its effects to those of the previous part.

More often than not the elastic means are helical coil springs appropriately disposed circumferentally around the axis of the assembly, all or some of these springs being located on a common circumference of the assembly, for example.

The present invention is more particularly directed to the case where to minimize if not eliminate certain noises or vibrations it is desirable for the action of those springs which are alone operative for relatively low valves of the torque to extend over a relatively great proportion of the relative angular displacement between the two coaxial parts concerned.

Specifically to match them to relatively low values of torque, these are springs of relatively low stiffness.

Thus these springs are of relatively great circumferential length and relatively low stiffness and therefore relatively sensitive to centrifugal force, the effect of which is to make them curve with their median part offset radially outboard of their ends, where they can on the other hand be appropriately retained, and this is all the more marked in that the circumference on which they are disposed is of relatively large radius.

Moreover when under load on relative anqular displacement between the coaxial parts between which they are disposed, those springs of relatively great circumferential length and relatively low stiffness also tend to become curved, by virtue of a deformation similar to the previously described deformation, because of the compressive loading applied to their ends.

Such curved deformation of the springs inevitably generates friction since the springs then bear on some part of the torsional damper device relative to which they are moving in the circumferential direction.

The resulting unwanted friction torque combines in an unpredictable manner with that procured systematically to bring about the desired damping.

For the device to operate correctly it is vital to have complete control over the friction torque at all times and in particular for this torque not to vary too much as a function, for example, of the speed and/or degree of relative angular displacement.

If the friction torque is not adequately controlled, it may obliterate the torque to be transmitted when the value of this torque is low.

It is therefore important to minimize if not to eliminate the unwanted friction torque which may arise from bending of the relatively low stiffness springs.

In French patent application No. 84 17493 tiled Nov. 16, 1984 and the copending U.S. patent application Ser. No. 796,774, filed Nov. 12, 1985 corresponding thereto, retaining means are associated with these springs for this purpose, adapted to retain them radially against the action of centrifugal force.

These means comprise, for example, fingers extending circumferentially over which are engaged the relatively low stiffness springs to be retained, said fingers being in one piece with the flanges between which the springs are circumferentially operative.

An arrangement of this kind is satisfactory for certain applications but only partially so for others, the fingers employed for a particular spring being able to have only a limited circumferential size and therefore having no option but to leave free the median part of a spring for part at least of the relative angular displacement between the coaxial parts concerned, unless they are able to pass one another circumferentially for the remaining part of such angular displacement.

Also, being in one piece with the flanges unless specific action is taken they feature edges likely to damage the associated springs prejudicing the integrity thereof.

In another embodiment also described in the above mentioned patent application the retaining means employed comprise a ring over which are engaged the relatively low stiffness springs to be retained, said ring extending annularly around the axis of the assembly and thus being common to all the springs concerned.

A ring of this kind may also prove satisfactory, especially if the springs are all of exactly the same stiffness and subject to exactly the same centrifugal force and loading, together forming a balanced assembly.

As an inevitable result of the various corresponding forces, this assembly together with the associated ring tends in use to be displaced radially in a certain direction.

It has therefore to be retained in position and in the aforementioned ponding patent application, in order to achieve this, the ring employed in keyed radially to other parts of the torsional dampet device.

Thus a ring of this kind cannot fail to generate friction where it is in contact with these parts.

Also, being disposed inside the springs, as previously, it is difficult to fit and problems may arise because the space available is limited.

Finally, the necessary radial retention arrangements imply a certain degree of complexity in respect of the parts of the torsional damper device concerned.

A general object of the present invention is an arrangement which, whilst providing a simple and effective way of radially retaining the springs in question, also makes it possible to minimize or even eliminate certain at least of the disadvantages outlined hereinabove.

SUMMARY OF THE INVENTION

The present invention consists in a torsional damper device comprising at least two coaxial parts disposed to rotate relative to each other within defined limits of relative angular displacement, circumferentially acting elastic means adapted to operate circumferentially between said at least two coaxial parts over part at least of said relative angular displacement and comprising at least two coil springs spaced circumferentially along a common circumference of the device, and retaining means associated with said springs, common to all said springs, adapted to retain them against the action of centrifugal force and disposed at least in part radially outside said common circumference.

For example, the retaining means comprises for each spring a respective retaining lug extending generally parallel to the axis of the device and a ring extending annularly around the axis, common to all the springs and carrying the lugs.

Alternatively, the retaining means may comprise a retaining rim extending annularly around the axis of the device, common to all the springs and encircling the springs.

Be this as it may, whether using a ring with retaining lugs or a retaining rim, the retaining means may advantageously be disposed floating relative to the axis of the device in the radial and circumferential directions, without contacting any parts of the torsional damper device concerned other than the springs to be retained. By virtue of a floating mounting of this kind the retaining means employed in accordance with the invention may follow circumferentially the springs with which they are associated during their displacement or deformation, which advantageously minimizes the unwanted friction produced between them and these springs.

Indexing means are preferably provided between the retaining means and one at least of the springs concerned to provide for effective circumferential retention of the retaining means relative to the springs, possibly with clearance.

Also, being disposed externally of the springs, the retaining means employed in accordance with the invention are relatively easy to fit, and they are located in a region of the torsional damper device concerned in which the space available is less limited than that corresponding to the internal volume of the springs.

Finally, they can be easily curved at least in part to match the profile of the springs that they are responsible for retaining, which advantageously eliminates any risk of damaging the springs and also makes it possible to retain them axially relative to the springs in a very simple manner, advantageously increasing their rigidity.

As previously, the assembly comprising the springs concerned and the retaining means associated with them in this way is not necessarily strictly balanced; to the contrary, this assembly may be subject to a resultant force tending to displace it radially in a certain direction.

However, any such resultant force is necessarily weak and it is therefore possible in practice to accept the friction which may result therefrom.

The characteristics and advantages of the invention will emerge from the following description given by way of example with reference to the accompanying schematic drawings.

BRIEF DESCRIPTION OF THE DRAWINGS

FIGS. 7 and 8 are views respectively analogous to those of FIGS. 5 and 6 for another of the flanges that the torsional damper device in accordance with the invention comprises.

FIG. 9 is a partial view in perspective analogous to that of FIG. 4 and concerning another embodiment.

FIG. 10 is a partial view of this other embodiment in transverse cross-section on the line IX—IX in FIG. 9.

FIG. 11 is another partial view in perspective, repeating part of FIG. 4, and concerning a further embodiment.

FIG. 12 is a view of this further embodiment in transverse cross-section on the line XII—XII in FIG. 13.

FIG. 13 is a partial view of it in plan, as seen in the direction of the arrow XIII in FIG. 12.

DESCRIPTION OF THE PREFERRED EMBODIMENTS

Figure 1:
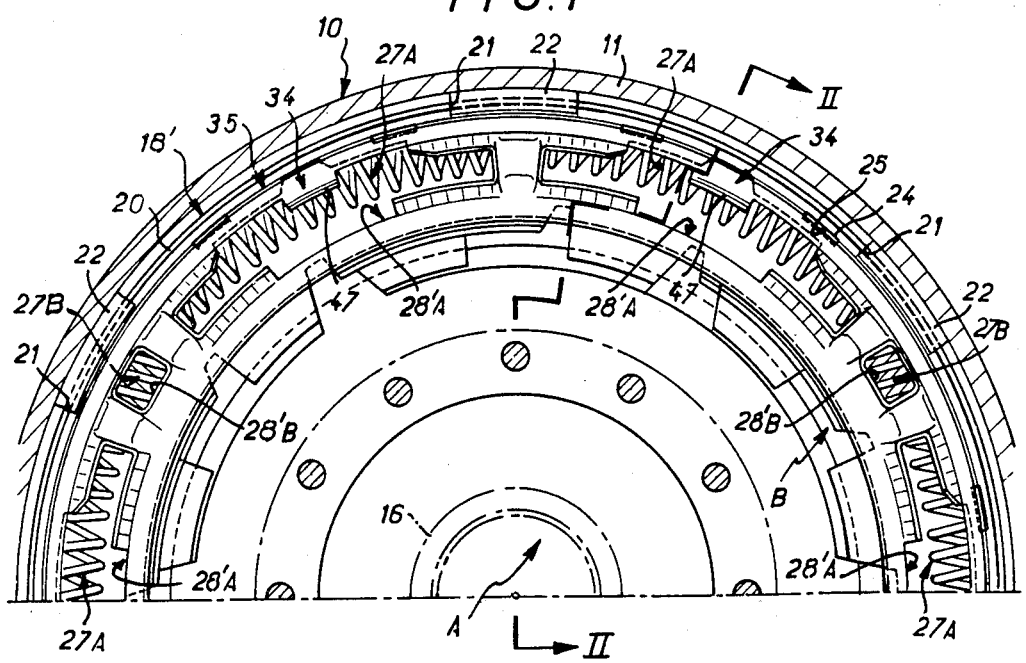
FIG. 1 is a partial view in elevation of a torsional damper device in accordance with the invention inside a hydraulic coupling device, in cross-section on the broken line I—I in FIG. 2.

The figures illustrate by way of example the application of the invention to equipping a hydraulic coupling device with a built-in torsional damper device, as is also the case in the aforementioned copending patent application.

As a hydraulic coupling device of this kind does not of itself form part of the present invention, it will not be described in complete detail here.

Only those components of it necessary to understanding the invention will be mentioned.

In practice, the hydraylic coupling unit comprises, within the internal volume of a cover 10 formed by a generally cylindrical wall 11 and a generally transverse wall 12, between this generally transverse wall 12 and a turbine wheel 13, a torsional damper device 15.

The torsional damper device 15 will not be described in complete detail either, only those of its components to which the present invention relates being covered by the following description.

In the embodiment shown, the torsional damper device 15 comprises two coaxial parts A and B disposed to rotate relative to each other within defined limits of relative angular displacement and against circumferentially acting elastic means adapted to operate circumferentially between them over part at least of such relative angular displacement.

Firstly, there is a first part A which comprises a hub 16 (FIG. 1) which, if the cover 10 is designed to be constrained to rotate with a first shaft, in practice a driving shaft, is intended to be constrained to rotate with a second shaft, in practice a driven shaft; it further comprises two flanges 17 and 17' hereafter referred to for convenience as the hub flange and hub counter-flange, respectively, each of which forms an annular member around the hub 16, extending generally transversely relative to the axis of the assembly and each meshing with said hub 16 through meshing means with clearance that there is no need to explain here.

Then there is a second part B which comprises two transverse flanges 18 and 18', hereafter referred to for convenience as guide rings, which are constrained to rotate together and each of which also forms an annular member around the hub 16, but totally free to rotate relative to the hub in either circumferential direction; between them are axially disposed the hub flange 17 and the hub counter-flange 17' previously mentioned.

Figure 5:
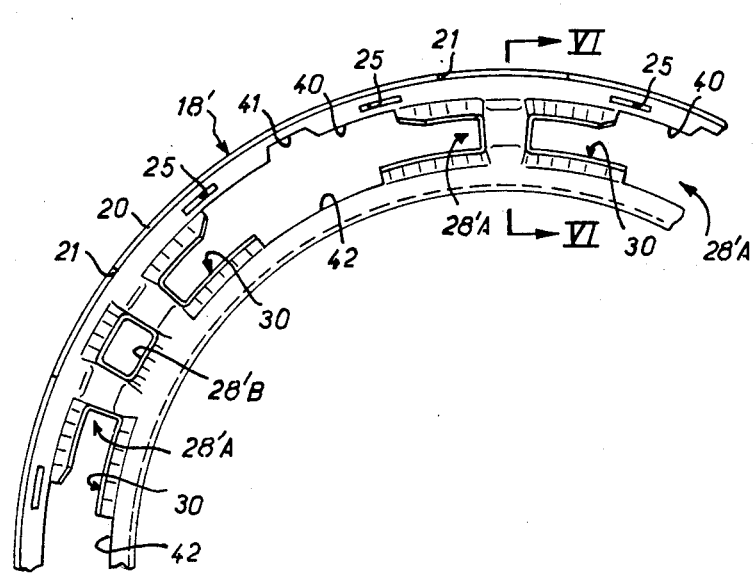
FIG. 5 is partial view in elevation of one of the flanges that the torsional damper device comprises, to the same scale as FIG. 1.
Figure 6:
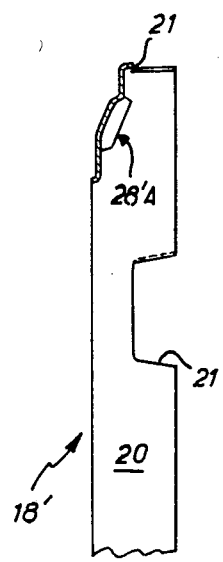
FIG. 6 is a partial view of this flange in axial cross-section on the line VI—VI in FIG. 5.
Figure 2:
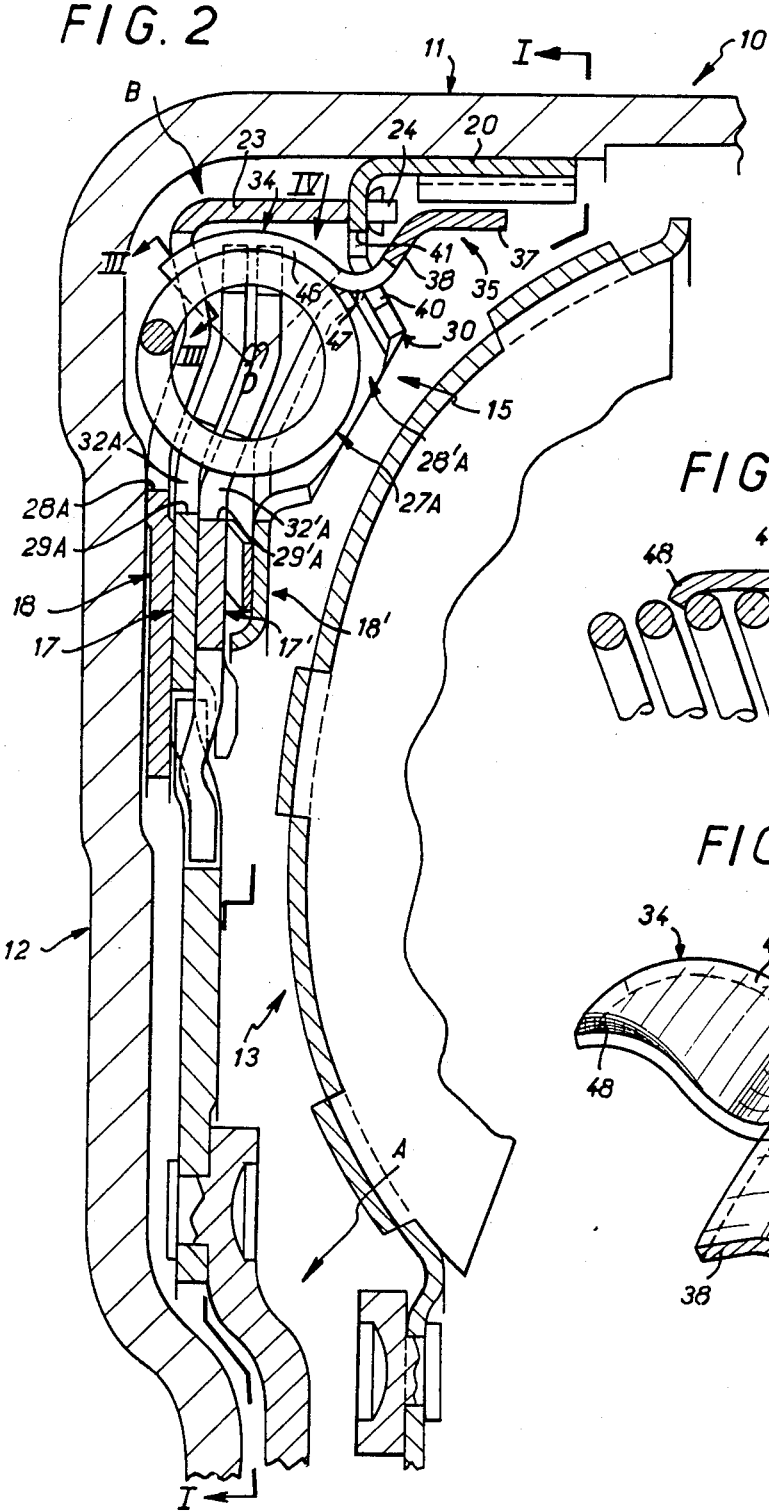
FIG. 2 is a partial view of the hydraulic coupling device and the torsional damper device to a larger scale and in axial cross-section of the broken line II—II in FIG. 1.
Figure 3:
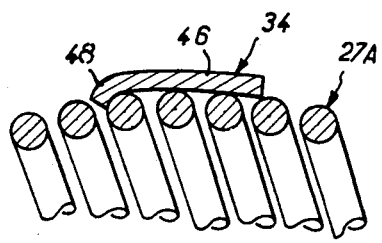
FIG. 3 is a partial view of the torsional damper device in accordance with the invention to a different scale and in transverse cross-section on the line III—III in FIG. 2.
Figure 4:
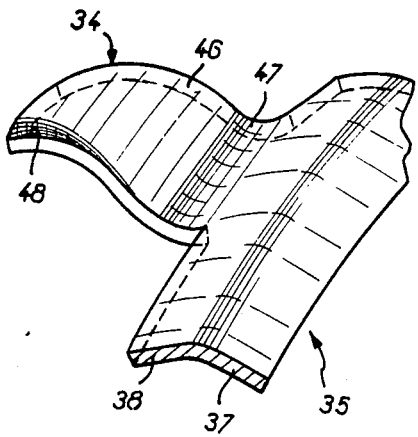
FIG. 4 is a partial view in perspective of the retaining means employed in accordance with the invention in this torsional damper device.

As is more clearly seen in FIGS. 5 and 6, the guide ring 18' which is that axially farthest from the generally transverse wall 12 of the cover 10 comprises, at its outside periphery, an axial ring 20 which extends axially away from said generally transverse wall 12 and which has spaced along its edge trapezoidal contour notches 21 adapted to cooperate with "dogs" 22 (FIG. 1) welded to the generally cylindrical wall 11 of said cover 10, these arrangements being described in detail in the aforementioned copending patent application.

In this embodiment it is therefore through the intermediary of the guide ring 18' that the part B of the torsional damper device 15 of which it forms part is constrained to rotate with the cover 10 and, through the latter, with the corresponding driving shaft.

The guide ring 18, that axially nearest the generally transverse wall 12 of the cover 10, and in practice in contact with the latter, also comprises at its outside periphery an axial rim 23 directed axially away from said generally transverse wall 12.

This axial rim 23, which extends beyond the outside periphery of the hub flange 17 and the hub counter-flange 17', has spaced along its edge axially projecting tenons 24 in corresponding relationship with windows 25 formed for them in the guide ring 18'.

To fasten the guide rings 18 and 18' together in rotation, the tenons 24 in the guide ring 18 are engaged in respective windows 25 in the guide ring 18' and, beyond these, their lateral edges are each crimped where they contact the guide ring 18'.

In the embodiment shown the circumferentially acting elastic means provided between the parts A and B thus constituted of the torsional damper device 15 comprises two stages of helical coil type springs, all disposed on a common circumference of the assembly, being appropriately distributed circumferentially along this circumference.

There are thus, in a first stage, relatively low stiffness springs 27A and, in a second stage, relatively high stiffness springs 27B, in practice of significantly higher stiffness and shorter than the aforementioned springs 27A.

For the purpose of retaining them in place the springs 27A and 27B are individually disposed partly in housings 28A, 28B, 28'A, 28'B formed for them in the guide rings 18 and 18' and partly in housing 29A, 29B, 29'A, 29'B also formed for them in the hub flange 17 and the hub counter-flange 17'.

In the case of the guide ring 18, the housings 28A and 28B are simple windows.

In the case of the guide ring 18', the housings 28'A and 28'B are stamped portion each of which is outwardly open through an individual window 30 in its median area.

Finally, in the case of the hub flange 17 and the hub counter-flange 17', the housings 29A, 29'A, 29B and 29'B are merely notches formed in the outside periphery of the hub flange 17 and the hub counter-flange 17', the arrangement being exactly as if at said outside periphery said hub flange 17 and said hub counter-flange 17' were reduced to radial arms 32A, 32B, 32'A and 32'B delimiting in pairs said notches 29A, 29B, 29'A and 29'B.

In practice only the notches 29A and 29'A and thus the arms 32A and 32'A are visible in the figures.

By virtue of arrangements described in detail in the aforemented copending patent application, the springs 27A are adapted to operate alone for low values of the torque to be transmitted between the coaxial parts A and B and are of relatively great circumferential length.

Given this relatively great circumferential length and by virtue of their relatively low stiffness, there are associated with them retaining means adapted in particular to retain them radially against the action of centrifugal force and compression loads.

In accordance with the invention the retaining means thus associated with the springs 27A are at least in part disposed radially outside them, on the side of the circumference of the assembly on which the springs 27A lie.

In the embodiment specifically shown in FIGS. 1 through 8, the retaining means employed comprise, for each spring 27A, a lug 34 referred to hereafter for convenience as a retaining lug which extends generally parallel to the axis of the assembly and which is carried by a ring 35 which, like the set of springs 27A, extends annularly around said axis.

The retaining means employed in accordance with the invention, which are thus common to all the springs 27A, are not on the other hand associated with the relatively high stiffness springs 27B, no lugs 34 for these being provided on the ring 35.

In the embodiment shown in the ring 35 carrying the retaining lugs 34 extends outside the volume delimited axially by the guide rings 18 and 18', on the side of the latter facing the turbine wheel 13.

It comprises a generally cylindrical portion 37 the generatrices of which are generally parallel to the axis of the assembly and, obliquely disposed relative thereto in the direction towards said axis, a generally frustoconical portion 38 on the edge of which are upstanding retaining lugs 34, in the manner of the teeth of a comb.

The ring 35 and therefore the retaining lugs 34 that it carries are disposed floating relative to the axis of the assembly in the radial and circumferential directions.

To this end the retaining lugs 34, which generally extend from the guide ring 18' to the guide ring 18, extending slightly beyond the latter, pass through the various flanges concerned with circumferential clearance so that they do not touch them.

In the case of the guide ring 18' there is provided for this purpose in the median area of that of the circumferential lips of the window 30 of each housing 28'A which is radially the outermost a notch 40 the circumferential extent of which is relatively great and the bottom of which is itself formed in its median area and for reasons which will be explained hereinafter with a notch 41 of smaller circumferential length.

As a corollary to this and for reasons which will also be explained hereinafter, that of the circumferential lips of the window 30 of a housing 28'A of this kind which is radially the innermost itself features in its median area a notch 42.

In the case of the hub flange 17, the hub counter-flange 17' and the guide ring 18, the corresponding housings 29A, 29'A and 28A are of sufficient extent circumferentially for there to be no risk of interference between their edges and the retaining lugs 34.

However, for reasons which will emerge hereafter, the radially innermost circumferential edge of these housings 28A is, in the embodiment shown, formed with a flat 44 in its median area and the same applies to the radially innermost circumferential edge of the housings 29A and 29'A; this is to increase the radial size of these openings in their median area in the direction towards the axis of the assembly.

As shown, each of the retaining lugs 34 is preferably, over a part 46 at least of its length, curved axially, that is to say in a plane passing through the axis of the assembly, to match the transverse profile of the spring 27A with which it is associated.

In practice, the retaining lug 34 envelops this transverse profile; in the embodiment shown, it envelops this profile over an angle D of at least 90°, but obviously a smaller angle could equally well suffice, such as 60°, for example.

The part of each spring 27A that is enveloped in this way is the part farthest away from the axis of the assembly, and the concave side of the corresponding curved part 46 of the retaining lug 34 associated with the spring 27A faces towards said axis.

Linking its curved part 46 to the ring 35 carrying it, each retaining lug 34 features a curve 47 the concave side of which faces the opposite way, away from the axis of the assembly.

As a result of this, each retaining lug 34 extends substantially in line with the median area of the spring 27A with which it is associated, being applied against it.

Indexing means are preferably provided between the thus constituted retaining means and one at least of the springs 27A, so as to permit these retaining means to follow the springs 27A as they are displaced or deformed, in phase therewith, and so as to avoid producing any friction torque between them and the springs.

In the embodiment specifically shown in FIGS. 1 through 8, these indexing means result from the fact that at least one of the lateral edges of at least one of the retaining lugs 34 is shaped helix-fashion to conform to the profile of the turns of the springs 27A over part at least of its length, for the purpose of engaging it over part of least of one of the turns of the spring 27A with which it is associated.

In the embodiment shown only one of the lateral edges of a retaining lug 34 is locally shaped helix-fashion in this way, said lateral edges featuring an appropriate folded edge 48 at the end.

The lateral edges of the retaining lugs 34 are, in the embodiment shown, parallel to each other and, the springs 27A being in practice all identical, the retaining lugs 34 are also all identical.

It is obvious, however, that this is not necessarily the case.

At assembly time, following assembly of the torsional damper device 15, the axial lugs 34 are offered up axially in line with the windows 30 in the guide ring 18, each aligned with the corresponding notch 41 in the radially outermost circumferential lip of the window 30.

The retaining lugs 34 are then inserted all at once into the interior volume of the torsional damper device 15, by means of said windows 30.

During such insertion, which is obtained by virtue of the notches 41 in the windows 30, the springs 27A are obliged by the retaining lugs 34 to deflect elastically in their median area towards the axis of the assembly.

This is the reason for the notch 42 in the radially outermost circumferential lip of the windows 30 of the guide ring 18 and for increasing the depth in the direction towards the axis of the assembly, by means of the aforementioned flats, of the corresponding housings 28A, 29A, 29'A in the guide ring 18, the hub flange 17 and the hub counter-flange 17', which permit such temporary elastic deformation of the springs 27A in the direction towards the axis of the assembly.

On completion of axial insertion of the retaining lugs 34, the springs 27A return elastically to their initial configuration and, then lying against the concave side of the retaining lugs 34, they thereafter procure appropriate axial retention thereof within the torsional damper device 15.

Thus the fitting of the retaining lugs 34 in accordance with the invention is a snap fastener-like action.

Following such assembly the curve 47 in the retaining lugs 34 by means of which they extend through the guide ring 18' is circumferentially aligned with the notch 40 in the radially outermost circumferential lip of the corresponding window 30 in the guide ring 18'.

The circumferential size of this notch 40 is made sufficient for there to be no risk of interference in service between the retaining lugs 34 and the guide ring 18'.

The same applies in respect of the retaining lugs 34 and the hub flange 17 and the hub counter-flange 17'.

The same also applies to the passing of the retaining lugs 34 through the guide ring 18.

In practice, the circumferential size of a notch 40 on either side of a retaining lug 34 is substantially equal to one half the total deformation or displacement travel of the springs 27A when it is symmetrical, that is to say when this travel is the same whether it is a question of "upshift" operation of the assembly, the motor torque predominating over the resisting torque, or "downshift"

operation of the assembly, when the resisting torque predominates over the motor torque.

Because of the indexing means provided for this purpose, the retaining lugs 34 remain in phase with the springs 27A during their deformation or displacement on relative angular displacement between the two coaxial parts A and B, so that the friction that may arise between the springs 27A and the retaining lugs 34 is itself limited or even non-existent.

While permitting elastic play of the springs 27A, because of the indexing means the retaining lugs 34 in accordance with the invention do not move relative to the springs 27A.

On this point, it has to be emphasized that, as already indicated hereinabove, the retaining lugs 34 preferably extend substantially to the middle of each spring 27A.

In reality, this is the case when the total deformation or displacement travel of the springs 27A is symmetrical.

When the total deformation travel of the springs 27A is asymmetrical, however, the retaining lugs 34 are displaced in consequence relative to the median area of the springs 27A.

As is obvious, however, the positioning of the retaining lugs 34 relative to the springs 27A is not necessarily rigorous and can to the contrary, without any significant consequences, be to within one or more turns of the springs.

Likewise, it is entirely permissible to accept a certain play in this indexing, as the friction which may arise in service between the retaining lugs 34 and the springs 27A can only be weak in any case, and therefore acceptable.

Of themselves the retaining lugs 34A are of limited circumferential size, very much less than that of the springs 27A.

If the springs 27A form together with their retaining lugs 34 a balanced assembly, this assembly locates itself of its own accord at a distance from the axial rim 23 of the guide ring 18, because of the floating disposition of the ring 35 carrying said retaining lugs 34.

However, if the springs 27A do not form in conjunction with their retaining lugs 34 a totally balanced assembly and thus if, in service, there is contact between one or other of the retaining lugs 35 and the axial rim 23 of the guide ring 18, which will inevitably generate friction, this friction remains acceptable as it is due to a necessarily weak resultant force.

As for the rest, the operation of the torsional damper device 15 in accordance with the invention in service is in every respect identical to what it would be in the absence of the retaining means in accordance with the invention.

As such functioning is well known of itself, it will not be described here.

In the alternative embodiment shown in FIGS. 9 and 10, the indexing means provided between the retaining lugs 34 and the springs 27A result from the fact that one at least of the retaining lugs 34 comprises a projecting boss 50 over part at least of its length adapted to be inserted between two successive turns of the corresponding spring 27A.

As shown, the boss 50 may be very simply formed by a locally stamped out portion of the retaining lug 34 concerned.

In the embodiments shown in FIGS. 11 through 15, the indexing means result from the fact that at least one of the retaining lugs 34 carries at least one tab 51 projecting towards the axis of the assembly and adapted to locally flank one of the turns of the corresponding spring 27A.

For example (FIGS. 11 through 13), the tap is formed by one end of a bracelet or sleeve 52 obliquely encircling the retaining lug 34 concerned, the bracelet 52 being engaged with two notches 53 provided on the edges of the retaining lug for holding it in position.

In this case both ends of the bracelet 52 advantageously form a tab 51, adapted to bracket one of the turns of the spring 27A concerned.

As will be noted, the bracelet 52 is preferably mounted with circumferential clearance relative to the retaining lug 34 which carries it, facilitating its location relative to the lug when it is engaged over a turn of the spring 27A concerned.

Because of this clearance, and given the acceptable tolerance in respect of the required indexing, it is thus more easily possible, if required, to provide a bracelet 52 for each of the retaining lugs 34.

In practice, the tabs 51 formed by a bracelet 52 of this kind naturally extend obliquely, so as to match them to the helical contour of the turns that they are intended to flank and bracket.

Figure 14:
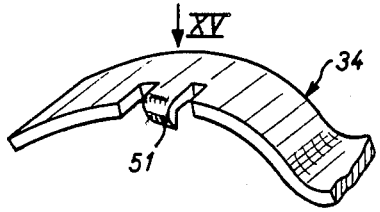
FIG. 14 is a partial view in perspective analogous to that of FIG. 4 and concerning a further embodiment.
Figure 15:
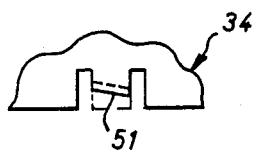
FIG. 15 is a partial view of this embodiment in plan, as seen in the direction of the arrow XV in FIG. 14.

In the embodiment shown in FIGS. 14 and 15 only one tab 51 is provided, for one at least of the retaining lugs 34, and it is in one piece with the latter.

In practice the tab is formed by cutting and bending an appropriate portion of one of the lateral edges of the retaining lug 34.

Figure 16:
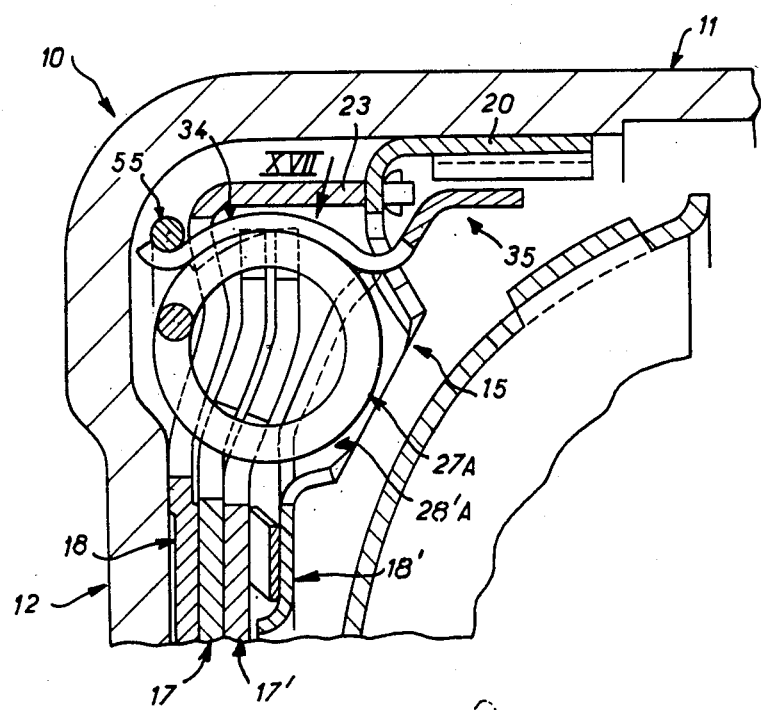
FIG. 16 is a partial view in axial cross-section, repeating part of that of FIG. 2, concerning a further embodiment.
Figure 17:
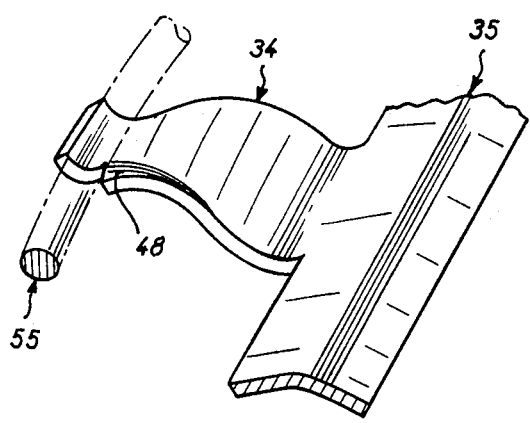
FIG. 17 is a partial view in perspective of the retaining means used in this embodiment.

In the embodiment shown in FIGS. 16 and 17, on the side opposite the ring 35 which carries them the retaining lugs 34 are conjointly surrounded by a ring 55 which, like the ring 35, extends annularly around the axis of the assembly, between the guide ring 18 and the generally transverse wall 12 of the cover 10.

The purpose of a ring 55 of this kind is to oppose any deformation of the retaining lugs 34 due to the radial loading to which they are subjected in service by the springs 27A.

In the embodiment shown, the indexing means employed are of the type described with reference to FIGS. 1 through 8, with the helical conformation folded edge 48.

It is obvious that they may just as well be of the type with bosses or tabs as described with reference to FIGS. 9 through 15.

In the embodiments shown in FIGS. 18 through 22 the retaining means employed in accordance with the invention comprise a rim 56, hereafter referred to for convenience as the retaining rim, which is common to all the springs 27A, extends annularly around the axis of the assembly, surrounding the springs, and, like the previously mentioned ring 25, is mounted to float radially and circumferentially relative to the axis of the assembly.

In practice the retaining rim 56 is disposed in its entirety within the volume delimited axially by the guide rings 18 and 18', more precisely within the volume delimited radially by the axial rim 23 of the guide ring 18, between the latter and the springs 27A, 27B.

It is placed therein before or after the springs 27A and 27B are fitted.

Like the previously mentioned retaining lug 34, the retaining rim 56 is axially curved to match the profile of the springs 27A over part at least of its width, in line with the portion of the springs 27A radially farthest from the axis of the assembly.

In the embodiment shown, it comprises a curved part 57 and an axially straight part 58 in the direction towards the guide ring 18′.

For any friction due to the retaining 57 to occur preferentially at the point of contact with the axial rim 23 of the guide ring 18 and not at the point of contact with the edge of the arms 32A, 32′A of the hub flange 17 and the hub counter-flange 17′, the radial size of said arms 32A, 32′A is preferably reduced sufficiently for these to be always located within the thickness of the springs 27A, 27B.

Be this as it may, the retaining rim 56 in accordance with the invention relates only to the relatively high stiffness springs 27B, these being in practice retained by the housings 28B, 28′B in which they are disposed and which are appropriately shaped for this purpose.

Figure 19:
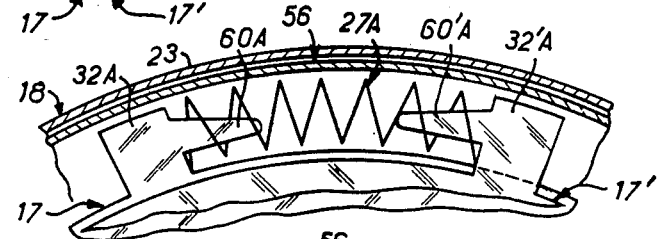
FIG. 19 is a partial schematic view of this embodiment to a different scale and in transverse cross-section on the broken line XIX—XIX in FIG. 18, for the rest configuration of the assembly.
Figure 20:
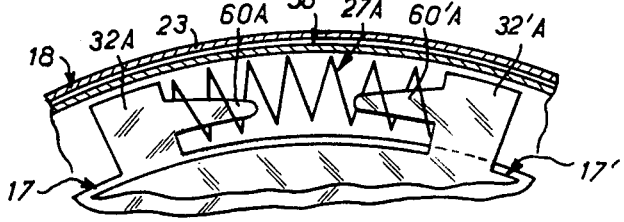
FIG. 20 is a partial view in transverse cross-section analogous to that of FIG. 19 on relative angular displacement between the two coaxial parts concerned of the torsional damper device in accordance with the invention.

In the embodiment specifically shown in FIGS. 19 and 20, the retaining means employed further comprise, by virtue of arrangements of the type described in the aforementioned copending patent application, fingers 60A, 60′A which are carried by the arms 32A, 32′A of the hub flange 17 and the hub counter-flange 17′, projecting circumferentially therefrom, and over which the springs 27A are engaged by their ends.

Figure 18:
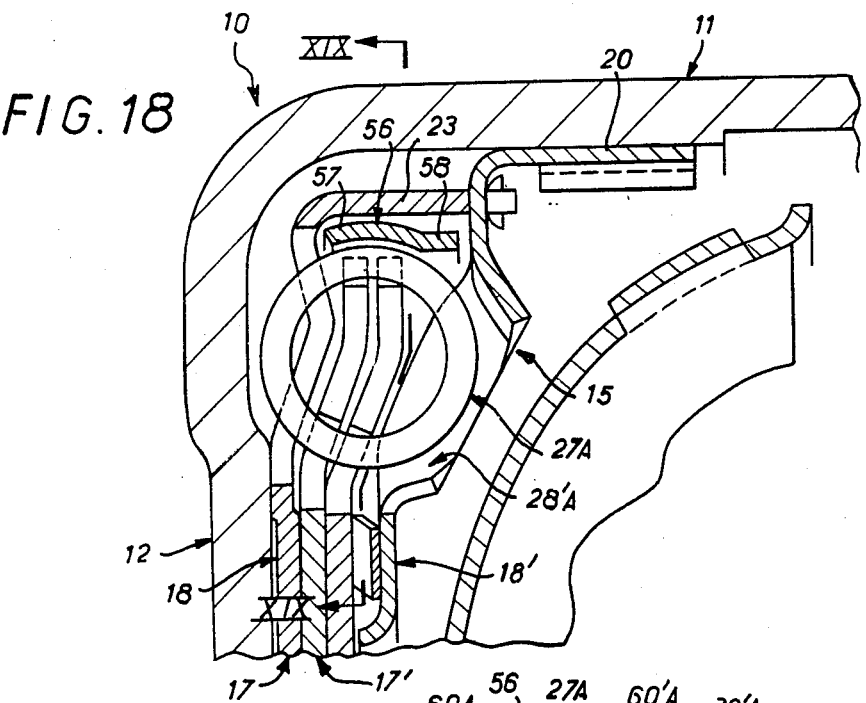
FIG. 18 is a partial view in axial cross-section, repeating part of that of FIG. 2, and concerning a further embodiment.

In the rest configuration, and as shown in FIGS. 18 and 19, the retaining rim 56 in accordance with the invention is not necessarily in contact with all the springs 27A, and possibly with only one of these (not shown).

In service and because of centrifugal force and compression loads between their points of support, the springs 27A are subject to deformation by curving away from the axis of the assembly.

Generally speaking, as each of them is retained at the ends by the fingers 60A, 60′A, such deformation concerns only their median portion, however.

Consequently, it is only through a median portion that they bear against the retaining rim 56 in accordance with the invention (FIG. 20) which is sufficient, through friction even though this is only moderate, to achieve the required indexing of the retaining rim 56 relative to the springs 27A.

Conjointly, and as previously, any unwanted contact, producing friction, between the springs 27A and the guide rings 18 and 18′ is avoided, since only the retaining rim 56 can bear against the axial rim 23 of the guide ring 18 if the assembly is not totally balanced.

Figure 21:
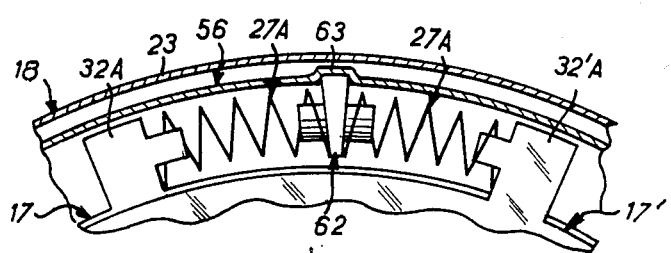
FIG. 21 is a partial view in transverse cross-section analogous to that of FIG. 19 and concerning a further embodiment.
Figure 22:
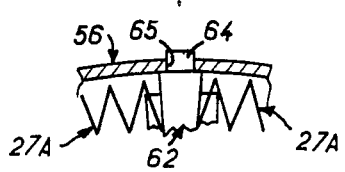
FIG. 22 is a partial view in transverse cross-section, repeating part of that of FIG. 21, and concerning a further embodiment.

In the embodiment shown in FIG. 21, in order to reduce their individual circumferential sizes, the springs 27a are associated in pairs, the two springs 27A of one such pair being mounted in series, through the intermediary of a spacer 62 disposed to float circumferentially between them, between the corresponding arms 32A, 32′A of the hub flange 17 and the hub counter-flange 17′.

The spacer 62 is then used to provide the necessary indexing of the retaining rim 56.

For example, and as shown here, these indexing means are the result of the fact that the retaining rim 56 is engaged with the spacer 62, by means of a locally stamped out portion 63.

As an alternative to this (FIG. 22) the spacer 62 comprises a peg 64 which passes through the retaining rim 56 by means of a hole 65 provided in the latter for this purpose and which preferably extends beyond the retaining rim 56.

In the case of an unbalanced assembly, any contact between the retaining rim 56 and the axial rim 23 of the guide ring 18 systematically occurs through the stamped portion 63 of the retaining ring 56 or the peg 64 on the spacer 62.

The corresponding friction forces are thus fully controlled.

When they are due to the peg 64 of a spacer 62, they may be minimized by making the spacer 62 of a synthetic material chosen for its specific friction properties, for example.

As a corollary to this, in these embodiments, and this also applies to the embodiments described with reference to FIGS. 1 through 17, the fingers 60A and 60′A of the arms 32A and 32′A of the hub flange part of the retaining means associated with the springs 27A may, if required, be reduced to simple stamped portions of limited circumferential size adapted only to secure appropriate positioning of said springs 27A.

Indexing means with stamped portions, hollows, tabs or other means, of the type for example described with reference to the previously mentioned retaining lugs, may of course be employed for the retaining rim 56, as an alternative to what has been described above.

The present invention is not limited to the embodiments described and shown, but encompasses any variant as to their execution and/or combination of the various component parts.

In particular, the retaining lugs or rim employed may be generally flat, although it is preferable for them to be curved, in order to stiffen them at least.

Also, when as described here there are relatively high stiffness springs, these may be disposed on a circumference of the assembly different from that on which are disposed the springs with which the retaining means employed are more particularly concerned, being those of relatively low stiffness, and more generally there may be springs on differnet circumferences and/or the torsional damper device concerned may comprise spings all of which have the same stiffness and/or all of which are operative simultaneously.

Furthermore, the field of application of the invention is not limited to that of torsional damper devices intended to equip hydraulic coupling units, but extends more generally to any form of torsional damper device, whatever the number of coaxial parts disposed to rotate relative to each other in pairs that a torsional damper device of this kind may comprise.

We claim:

1. Torsional damper device having an axis and comprising at least two coaxial parts disposed to rotate relative to each other within defined limits of relative angular displacement, circumferentially acting elastic means adapted to operate circumferentially between said at least two coaxial parts over at least part of said relative angular displacement and comprising at least two coil springs spaced circumferentially along a common circumference of the device, and retaining means associated with said springs common to all said springs and adapted to retain said springs against the action of centrifugal force, said retaining means being disposed at least in part radially outside said common circumference, and connecting means engageable with at least one of said springs for floatingly mounting said retaining means in radial and circumferential directions relative to the axis of the device and for indexing said retaining means relative to said at least one of said springs, said retaining means comprising, for each of said springs, a respective retaining lug extending generally parallel to the axis of the device, and a ring extending annularly around said axis common to all said springs and carrying said retaining lugs, each of said retaining lugs being curved in an axial plane and matching the transverse profile of the associated one of said springs.

2. Torsional damper device according to claim 1, wherein each of said retaining lugs partially envelopes said transverse profile of the associated one of said springs.

3. Torsional damper device according to claim 1, comprising another ring extending annularly around said axis of the device and encircling said lugs on the side thereof opposite said ring carrying said lugs.

4. Torsional damper device according to claim 3, wherein one of said coaxial parts comprises two transverse flanges constrained to rotate together and defining guide rings and the other of said coaxial parts comprises at least one transverse flange between said guide rings, said at least one transverse flange and said guide rings comprising housings for accommodating said springs, and said ring carrying said retaining lugs being disposed outside a volume delimited axially by said guide rings.

5. Torsional damper device according to claim 4, wherein said retaining lugs pass through the respective flanges with circumferential clearance.

6. Torsional damper device according to claim 1, wherein one of said coaxial parts comprises two transverse flanges constrained to rotate together and defining guide rings and the other of said coaxial parts comprises at least one transverse flange between said guide rings, said at least one transverse flange and said guide rings comprising housings for accommodating said springs, and said ring carrying said retaining lugs being disposed outside a volume delimited axially by said guide rings.

7. Torsional damper device according to claim 6, wherein said retaining lugs pass through the respective flanges with circumferential clearance.

8. Torsional damper device according to claim 6, wherein said retaining means is generally out of frictional contact with said guide rings.

9. Torsional damper device according to claim 1 wherein said connecting means comprises a projecting boss on at least one of said retaining lugs inserted between two turns of the associated one of said springs.

10. Torsional damper device according to claim 1, wherein said connecting means comprises at least one tab projecting towards the axis of the device and adapted to flank one turn of the associated one of said spring.

11. Torsional damper device according to claim 10, wherein said tab is in one piece with said at least one retaining lug.

12. Torsional damper device according to claim 10, comprising a sleeve surrounding said at least one retaining lug, one end of said sleeve forming said tab.

13. Torsional damper device according to claim 12, wherein each end of said sleeve forms a respective tab, said tabs being adapted to lie one on each side of one turn of the associated one of said springs.

14. Torsional damper device having an axis and comprising at least two coaxial parts disposed to rotate relative to each other within defined limits of relative angular displacement, circumferentially acting elastic means adapted to operate circumferentially between said at least two coaxial parts over at least part of said relative angular displacement and comprising at least two coil springs spaced circumferentially along a common circumference of the device, and retaining means associated with said springs common to all said springs and adapted to retain said springs against the action of centrifugal force, said retaining means being disposed at least in part radially outside said common circumference, and connecting means engageable with at least one of said springs for floatingly mounting said retaining means in radial and circumferential directions relative to the axis of the device and for indexing said retaining means relative to said at least one of said springs, said retaining means comprising a retaining rim extending annularly around the axis of the device common to all said springs and encircling said springs, said retaining rim being curved in an axial plane and matching the profile of said springs over part at least of their periphery, one of said coaxial parts comprising two transverse flanges constrained to rotate together and defining guide rings and the other of said coaxial parts comprising at least one transverse flange between said guide rings, said at least one transverse flange and said guide rings comprising housings for accommodating said springs, and said retaining rim being entirely disposed within the volume delimited axially by said guide rings.

15. Torsional damper device according to claim 14, wherein said connecting means comprises a spacer engaging said retaining rim and being mounted to float circumferentially between at least two of said springs connected in series by said spacer.

16. Torsional damper device according to claim 15, wherein said spacer comprises a peg passing through and extending beyond said retaining rim.

17. Torsional damper device having an axis and comprising at least two coaxial parts disposed to rotate relative to each other within defined limits of relative angular displacement, circumferentially acting elastic means adapted to operate circumferentially between said at least two coaxial parts over at least part of said relative angular displacement and comprising at least two coil springs spaced circumferentially along a common circumference of the device, and retaining means associated with said springs common to all said springs and adapted to retain said springs against the action of centrifugal force, said retaining means being disposed at least in part radially outside said common circumference, and connecting means engageable with at least one of said springs for floatingly mounting said retaining means in radial and circumferential directions relative to the axis of the device and for indexing said retaining means relative to said at least one of said springs, said retaining means comprising, for each of said springs, a respective retaining lug extending generally parallel to the axis of the device, and a ring extending annularly around said axis common to all said springs and carrying said retaining lugs, and said connecting means comprising a helical edge portion on at least one of said retaining lugs extending along and cooperating with a complementary helical portion of the associated one of said springs 18. Torsional damper device having an axis and comprising at least two coaxial parts disposed to rotate relative to each other within defined limits of relative angular displacement, circumferentially acting elastic means adapted to operate circumferentially between said at least two coaxial parts over at least part of said relative angular displacement and comprising at least two coil springs spaced circumferentially along a common circumference of the device, and retaining means associated with said springs common to all said springs and adapted to retain said springs against the action of centrifugal force, said retaining means being disposed at least in part radially outside said common circumference, and connecting means engageable with at least one of said springs for floatingly mounting said retaining means in radial and circumferential directions relative to the axis of the device and for indexing said retaining means relative to said at least one of said springs, said retaining means comprising, for each of said springs, a respective retaining lug extending generally parallel to the axis of the device, and a ring extending annularly around said axis common to all said springs and carrying said retaining lugs, each of said retaining lugs being curved in an axial plane and matching the transverse profile of the associated one of said springs, and said connecting means also comprising a projecting boss on at least one of said retaining lugs inserted between two turns of the associated one of said springs.

* * * * *